(12) United States Patent
Sasaki et al.

(10) Patent No.: US 6,397,006 B1
(45) Date of Patent: May 28, 2002

(54) OPTICAL HEAD DEVICE OF A SELF-PROPELLED TYPE

(75) Inventors: Hidemi Sasaki; Teruaki Koizumi, both of Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/985,594

(22) Filed: Nov. 5, 2001

(30) Foreign Application Priority Data

Nov. 7, 2000 (JP) ........................................ 2000-339406

(51) Int. Cl.⁷ .......................... G03D 17/50; H04N 5/222
(52) U.S. Cl. ...................... 396/30; 348/333.06; 348/231; 348/357; 348/275; 347/2; 347/225
(58) Field of Search ............................... 396/30; 347/2, 347/225; 348/231, 346, 350, 357, 333.06

(56) References Cited

U.S. PATENT DOCUMENTS 5,894,326 A * 4/1999 McIntyre et al. ...... 348/333.06
5,980,010 A * 11/1999 Stephenson .................... 347/2
6,262,757 B1 * 7/2001 Masubuchi et al. ......... 347/225
2001/0033744 A1 * 10/2001 Ohmura et al. ............... 396/30

* cited by examiner

Primary Examiner—D Rutledge
(74) Attorney, Agent, or Firm—Sughrue Mion, PLLC

(57) ABSTRACT

A head module contains a head motor, a reduction mechanism, and an optical head. The optical head is disposed behind an opening through which printing light is emitted toward an instant film. Both sides of the head module are provided with pinion gears rotated by the head motor via the reduction mechanism. A chassis is provided with rack gears respectively meshing with the pinion gears. The head module is reciprocated in a sub-scanning direction by the head motor. During the reciprocation of the head module, the printing light is emitted from the opening in accordance with image data to expose the instant film. A driving mechanism for the head module does not exist outside a movement range of the head module so that it is possible to downsize an instant printer using this head module.

13 Claims, 7 Drawing Sheets

OPTICAL HEAD DEVICE OF A SELF-PROPELLED TYPE

BACKGROUND OF THE INVENTION

1. Field of the Invention

The present invention relates to an optical head device, and more particularly to an optical head device of a self-propelled type in which an optical head is integrally provided with a motor and a reduction mechanism.

2. Description of the Related Art

A portable electronic still camera is widely used. In such an electronic still camera, an optical subject image is converted into an electrical image signal by means of a CCD image sensor or the like. Further, image data obtained after digital conversion is stored in a memory. It is known that some of the electronic still cameras have a built-in instant printer using an instant film. This instant printer can make a hard copy of a taken image.

In the instant printer using the instant film, an optical head is disposed so as to face an photosensitive surface of the instant film. The optical head irradiates printing light of each color of red (R), green (G) and blue (B) in accordance with the image data. By relatively moving the optical head in a sub-scanning direction, exposure is performed in a three-color frame-sequential manner to record a full-color image.

In the above-mentioned instant printer, however, a driving mechanism comprising a guide member, a motor, a reduction mechanism, and so forth are provided around the optical head. Thus, there arises a problem in that it is difficult to downsize the printer. Incidentally, the guide member is for guiding the optical head at the time of movement thereof, and the motor is a driving source.

SUMMARY OF THE INVENTION

In view of the foregoing, it is a primary object of the present invention to provide an optical head device in which a driving mechanism comprising a guide member, a motor, a reduction mechanism is prevented from projecting outside a movement range of an optical head.

It is a second object of the present invention to provide an optical head device by which it is possible to downsize an instant printer.

In order to achieve the above and other objects, the optical head device according to the present invention comprises a head module having a built-in optical head from which printing light is emitted. The head module also has a built-in motor and a built-in reduction mechanism including a pair of drive gears.

In the optical head device, the optical head is moved on a parallel with a surface of a photosensitive recording material to record an image.

The head module is movably supported by a chassis which is formed with a rack gear meshing with the drive gear. By activating the motor, the drive gear is rotated on the rack gear. Owing to this, the optical head is integrally moved with the head module.

In a preferred embodiment, the optical head has a pixel array which is perpendicular to a moving direction of the optical head. In other words, the optical head emits the printing light of a line shape. In another embodiment, the optical head is incorporated in the head module so as to be movable in a perpendicular direction relative to a moving direction of the head module. In this case, by activating the motor, the optical head is moved in the main-scanning direction in synchronism with the movement of the head module.

It is preferable that the recording material is positioned by the chassis. Further, it is preferable that a control signal for the printing light and a drive signal for the motor are supplied via a common flexible circuit board, one end of which is connected to the head module.

According to the optical head device of the present invention, it is unnecessary to provide a motor and so forth, which are for moving the head module, outside a movement range of the head module. Thus, an instant printer using the optical head device may be downsized. Moreover, it is possible to confirm movement performance of the head module itself at the time of manufacturing. In addition, both ends of the head module are positioned so that it is prevented to be bent and to be unfastened due to a drop impact and so forth.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT (S)

Figure 1:
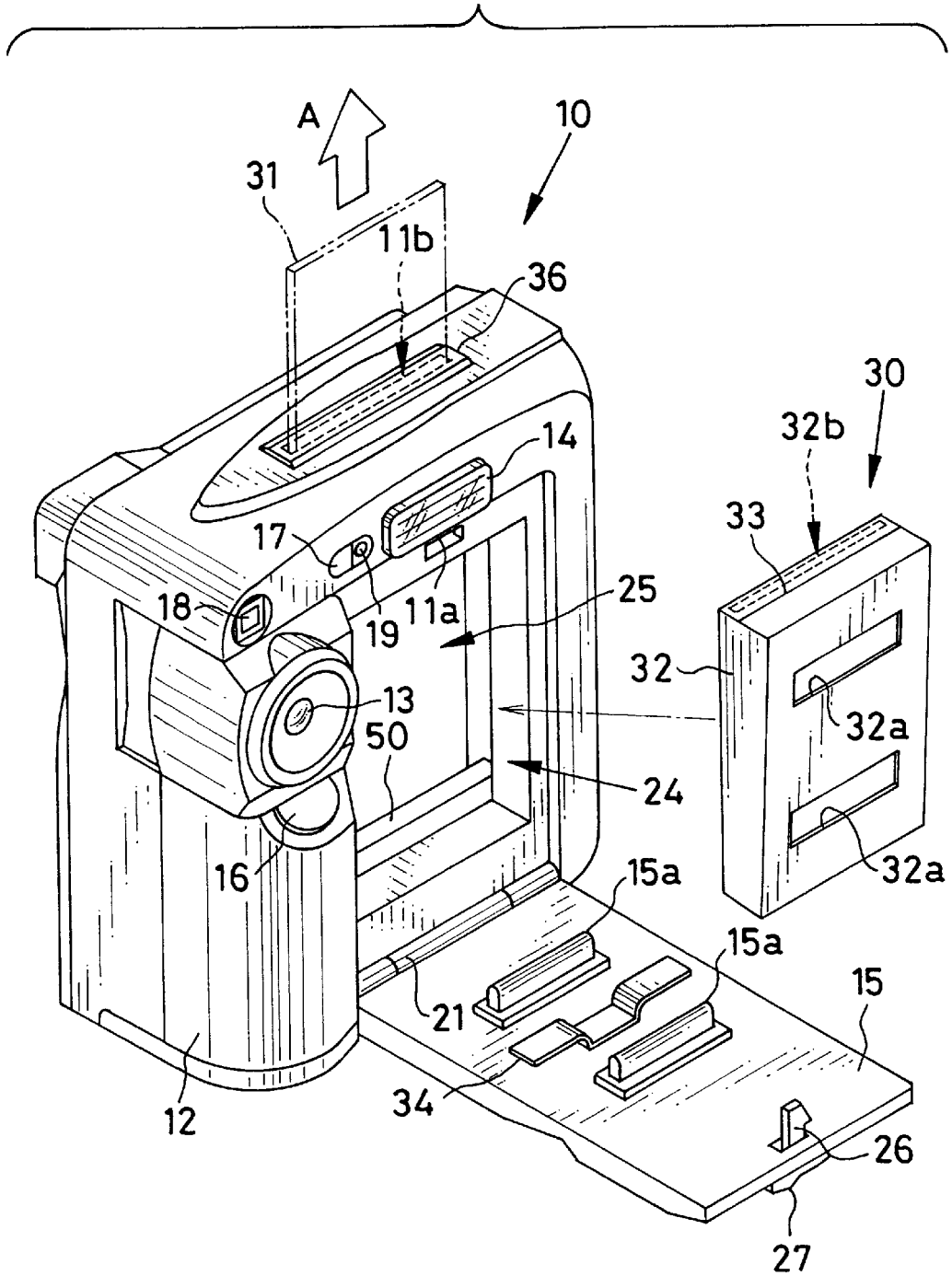
FIG. 1 is a front perspective view showing an electronic still camera having a built-in instant printer according to the present invention.

FIG. 1 is a perspective view showing a front side of an electronic still camera with a built-in instant printer. The electronic still camera 10 has a camera body 11 formed in a flat box-like shape. One side of the camera body 11 is provided with a grip portion 12 which is also used as a battery chamber. A front face of the camera body 11 is provided with a taking lens 13, a flash emitting portion 14, a pack-chamber lid 15, and a shutter button 16. Moreover, above the taking lens 13, are provided an AF light emitting window 17 and an AF light receiving window 18 which are used for an automatic focusing device. In addition, an AE light receiving window 19 used for an automatic exposure control device is provided.

Although illustration is abbreviated, an imaging section including a CCD image sensor is disposed behind the taking lens 13. Moreover, an AF light emitter and an AF light receiver are respectively disposed behind the AF light emitting window 17 and the AF light receiving window 18, and an AE light receiver is disposed behind the AE light receiving window 19. The AF light receiver and the AE light receiver measure a subject distance based on triangulation to automatically bring the taking lens 13 into focus by means of the automatic focusing device. The AE light receiver controls automatic exposure in accordance with measured brightness of a subject. In case the subject brightness lacks, flash light is adapted to be automatically fired from the flash emitting portion 14.

The pack-chamber lid 15 is pivotally attached to the camera body 11 by means of a hinge 21 behind which a pack chamber 24 and an instant printer 25 are disposed. The pack-chamber lid 15 is rotated between a closed position where the pack chamber 24 is light-tightly covered, and an open position where the pack chamber 24 is opened. When the pack-chamber lid 15 is rotated to the closed position, a claw 26 provided thereon engages with an engagement hole 11a formed in the camera body 11 to lock the pack-chamber lid 15 in the closed position. Meanwhile, upon moving a slider 27 provided on the pack-chamber lid 15, engagement of the claw 26 and the hole 11a is released to open the pack-chamber lid 15.

The pack chamber 24 is loaded with a film pack 30 in which well-known instant films 31 of a mono-sheet type are stacked to be contained in a plastic case 32. A number of the contained instant films 31 is ten, for example. The instant film 31 comprises a photosensitive sheet, a receiver sheet, and a pod including developer. Incidentally, such an instant film is sometimes called as an instant film unit. The photosensitive sheet is exposed to optically form a latent image thereon. After that, the photosensitive sheet and the receiver sheet are pressed, spreading the developer between them. Owing to this, a positive image is transferred to the receiver sheet.

A rear face of the case 32 is formed with an exposure aperture, which is not shown, for exposing a photosensitive surface of the instant film 31. A front face of the case 32 is formed with openings 32a for receiving a pair of press members 15a provided on the pack-chamber lid 15. A top face of the case 32 is provided with a film outlet 32b and a light shielding flap 33 for light-tightly covering the film outlet 32b. When the pack chamber 24 is loaded with the film pack 30 and the pack-chamber lid 15 is rotated to the closed position, a spring 34 attached to the pack-chamber lid 15 presses the back of the film pack 30 to set it to a predetermined position in the pack chamber 24. At the same time, the press member 15a presses the back of the stacked instant film 31 through the opening 32a against the exposure aperture.

Although illustration is abbreviated, a light shielding sheet having elasticity is attached to an inner wall of the case 32 so as to cover the opening 32a. Moreover, a light shielding plate whose size is identical with that of the instant film 31 is inserted between the exposure aperture and the outermost instant film 31. Thus, the light is prevented from entering the case 32 in an unused state. After the pack chamber 24 has been loaded with the film pack 30 and has been light-tightly closed with the lid 15, the light shielding plate is discharged through an exit described below.

A top face of the camera body 11 is provided with a slit-shaped exit 11b and an openable light shielding lid 36 for light-tightly covering the exit 11b. The instant film 31 on which a full-color image has been recorded by the instant printer 25 is discharged to the outside of the camera body 11 through the exit 11b in a direction shown by an arrow A.

Figure 2:
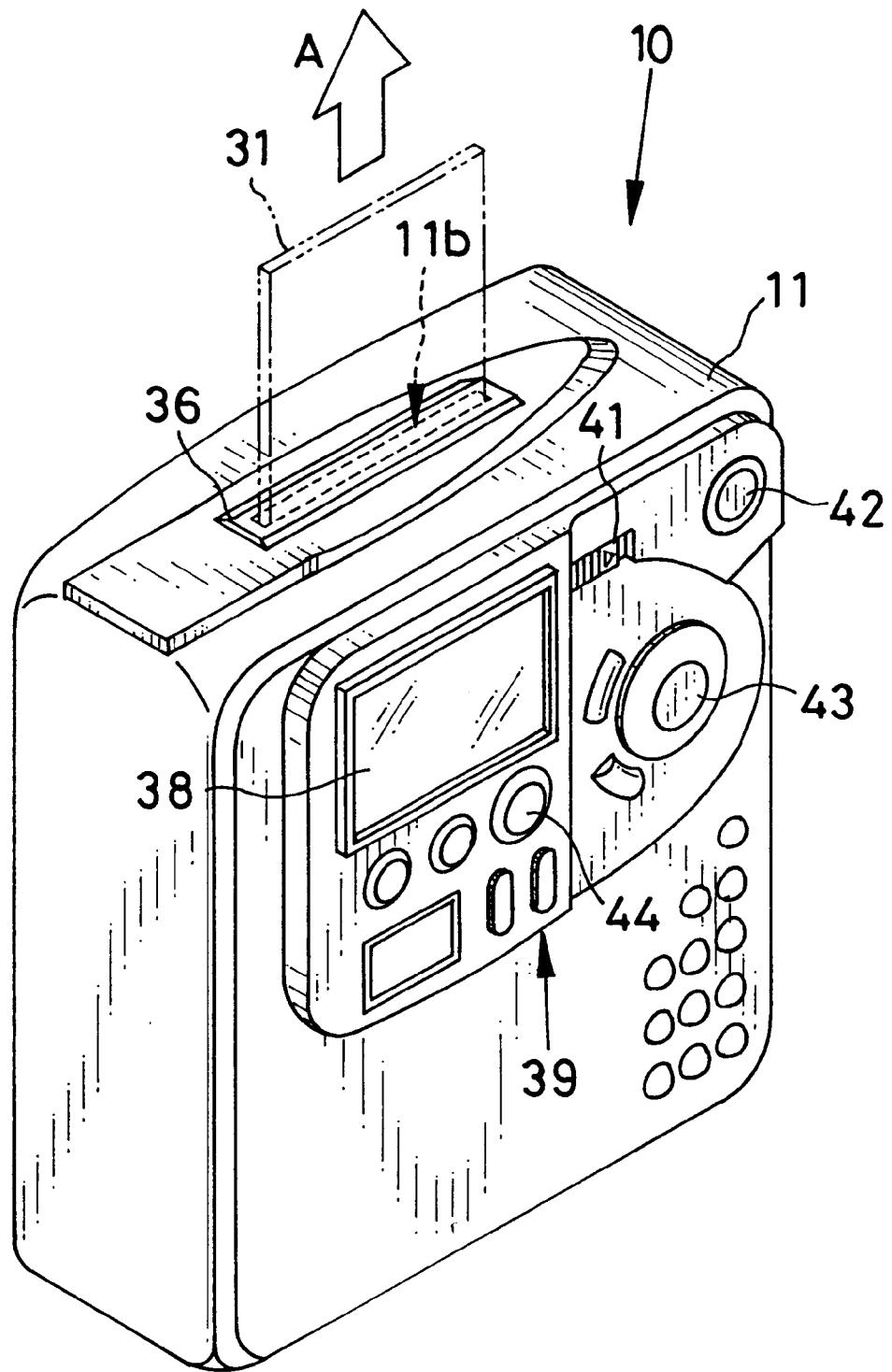
FIG. 2 is a rear perspective view showing the electronic still camera shown in FIG. 1.

In FIG. 2, an LCD panel 38 and an operation panel 39 are arranged at a rear face of the camera body 11. The LCD panel 38 displays, in real time, a subject image obtained through the taking lens 13 so that the LCD panel 38 constitutes an electric viewfinder. Further, the LCD panel 38 is also used for reproducing image data read from a built-in memory. The operation panel 39 is provided with a power switch 41, a print key 42, a multi-operation key 43, and a mode changing key 44 for changing an imaging/reproducing mode and a printing mode. In addition, are provided an eraser button for the image data, a switching key for selecting either of input and output of the image data performed between the electronic still camera and an external apparatus.

Figure 3:
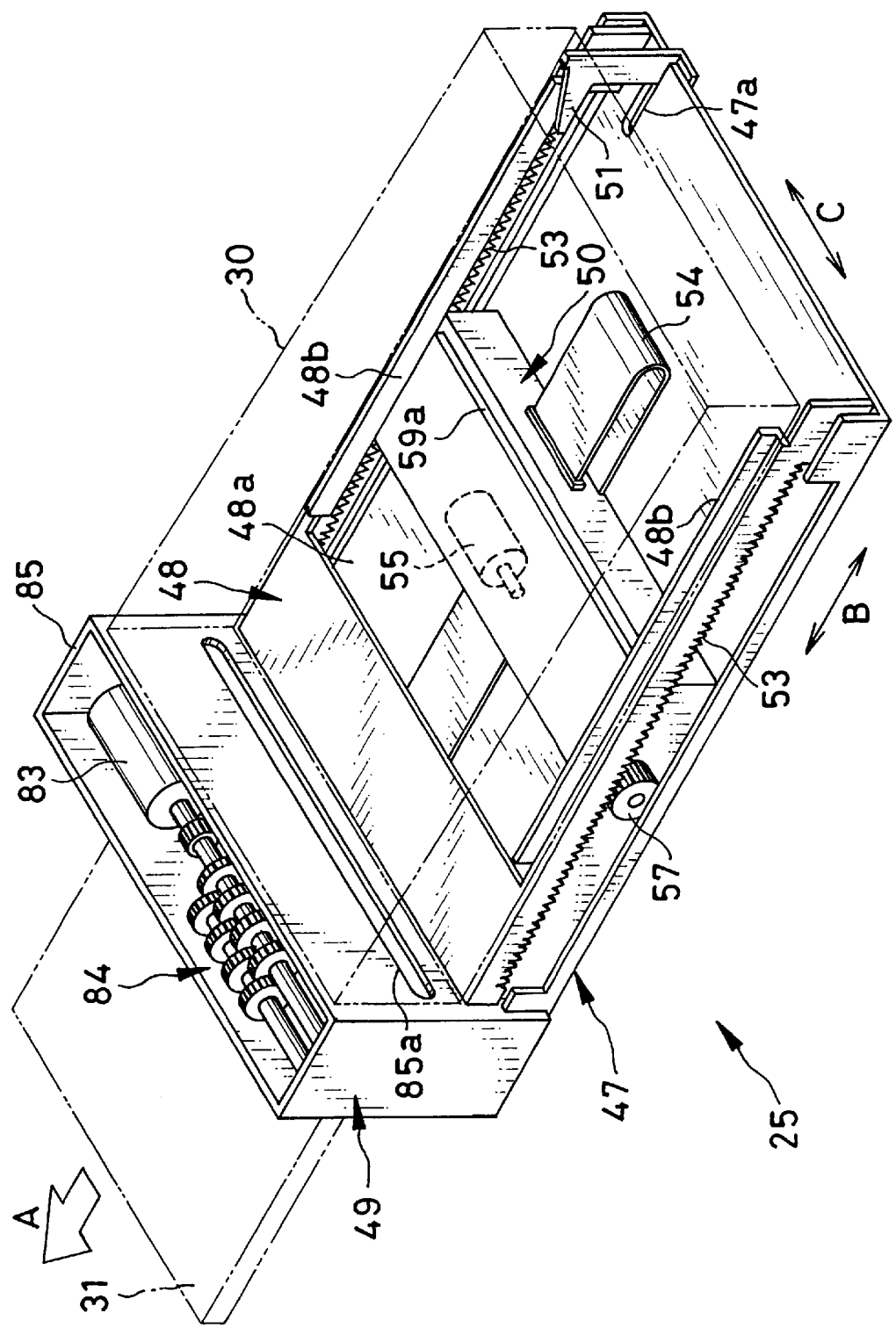
FIG. 3 is a perspective view showing a structure of the instant printer.

Such as shown in FIG. 3, the instant printer 25 is constituted of a base plate 47, a chassis 48, a gear box 49, a head module 50, a claw 51, and so forth. The chassis 48 is provided with an opening 48a, protrusions 48b, and rack gears 53. The opening 48a is formed so as to be larger than the photosensitive surface of the instant film 31. Thus, printing light emitted from the head module 50 is adapted not to be blocked. Incidentally, the head module 50 is described later in detail. The protrusions 48b engage with both edges of an aperture side of the film pack 30 to set the film pack 30 to a predetermined position. Reference numeral 54 denotes a flexible circuit board which supplies a print control signal to an optical head of the head module, and also supplies a drive signal to ahead motor.

Figure 4:
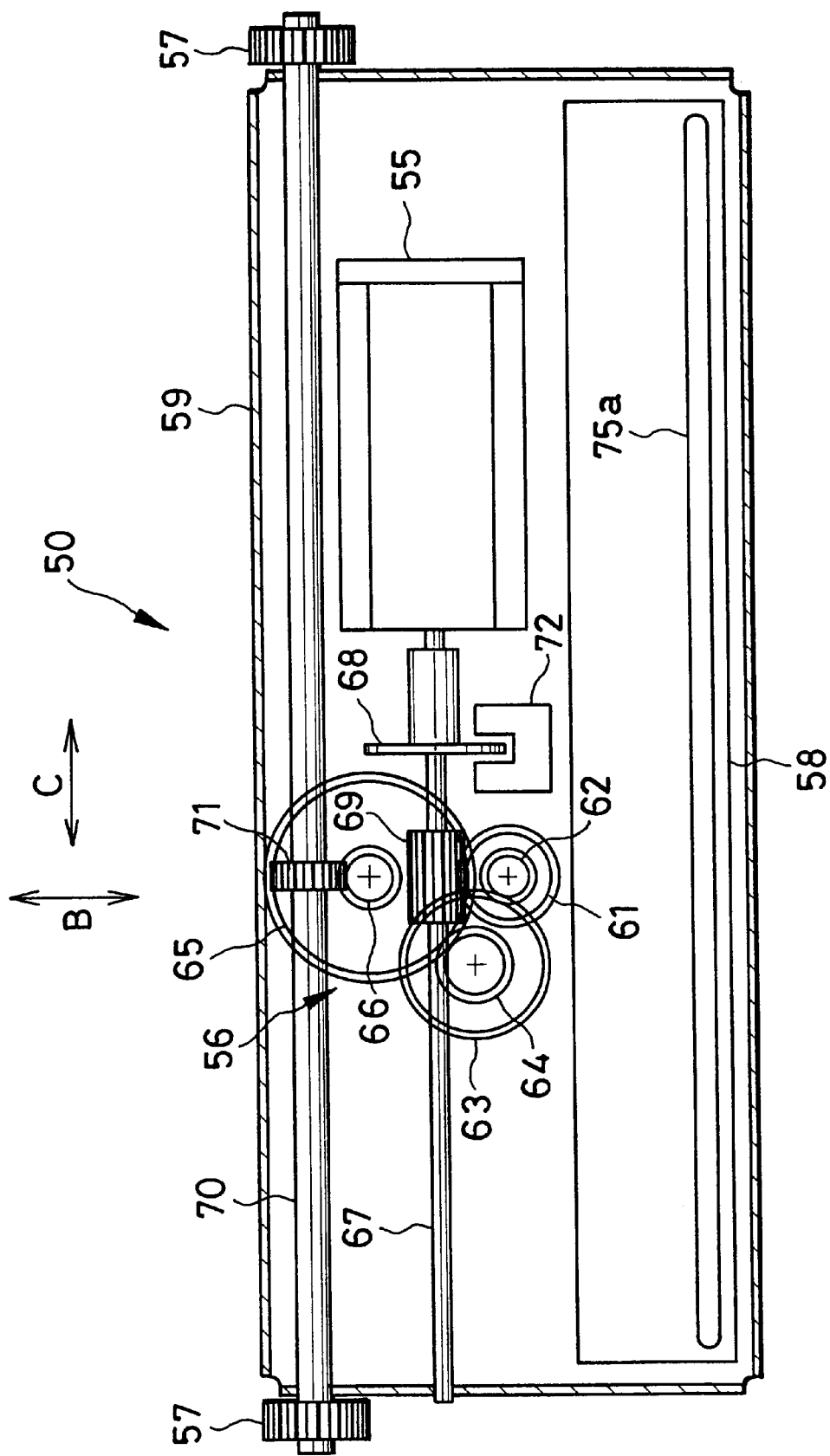
FIG. 4 is a plan view showing a structure of a head module.

As shown in FIG. 4, the head module 50 is constituted of a head motor 55, a reduction gear mechanism 56, pinion gears 57, and an optical head 58. The head motor 55 moves the head module 50 relative to the instant film 31. The optical head 58 emits the printing light toward the photosensitive surface of the instant film 31 in accordance with the image data. The head module 50 is integrally contained in a head case 59.

The reduction gear mechanism 56 comprises D1 to D6 gears respectively denoted by reference numerals 61 to 66. The D1 gear 61 and the D2 gear 62 are coaxially disposed, and the D3 gear 63 and the D4 gear 64 are coaxially disposed. Further, the D5 gear 65 and the D6 gear 66 are coaxially disposed. The D2 gear 62 meshes with the D3 gear 63. The D4 gear 64 meshes with the D5 gear 65. A first drive shaft 67 of the head motor 55 is provided with a rotary encoder 68 and a first worm gear 69. The rotary encoder 68 is formed with slits arranged at fixed intervals. The first worm gear 69 meshes with the D1 gear 61. Meanwhile, a second drive shaft 70 is provided with a second worm gear 71 meshing with the D6 gear 66. Both ends of the second drive shaft 70 projecting to the outside of the head case 59 are provided with the pinion gears 57 meshing with the rack gears 53 formed on the chassis 48 (see FIG. 3).

Drive force of the head motor 55 is transmitted to the second drive shaft 70 via the first worm gear 69, the reduction gear mechanism 56, and the second worm gear 71 so that the pinion gear 57 is rotated to move the head module 50 in a sub-scanning direction shown by an arrow B. A rotation pulse of the rotary encoder 68 is detected by a sensor 72 to control a moving amount and a moving speed of the head module 50. Incidentally, the moving amount and the moving speed may be controlled by using a pulse motor being as the head motor 55. In this case, a number of pulses for driving the pulse motor is counted.

Figure 5:
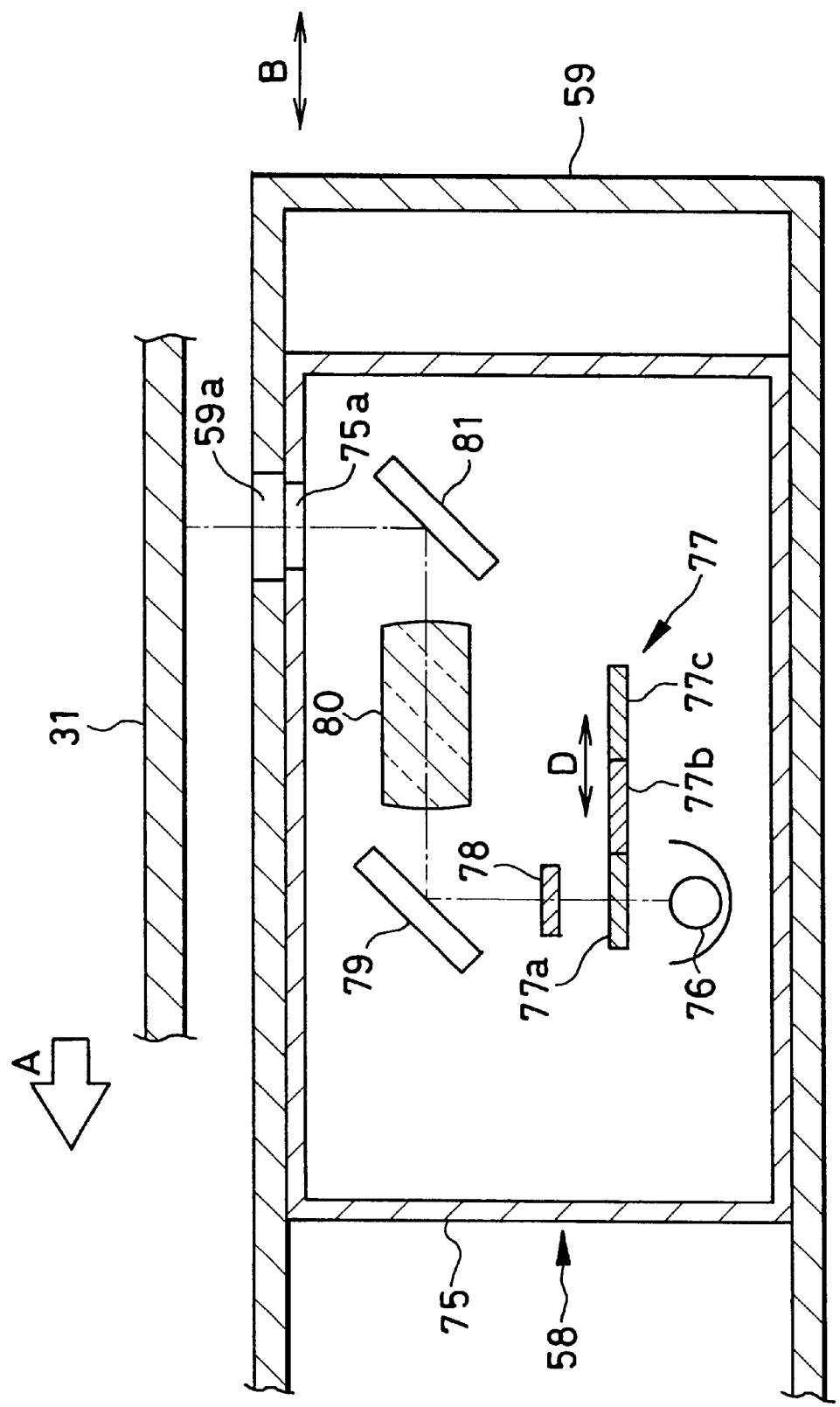
FIG. 5 is a sectional view showing a structure of an optical head.

FIG. 5 is a sectional view of the optical head 58 in which a thin fluorescent lamp 76 is contained in a light-shielded case 75 so as to extend in a longitudinal direction of the case 75 (main-scanning direction). The light emitted from the optical head includes each color of red (R), green (G), and blue (B). Incidentally, a light source of another kind may be employed if the above three colors are included.

A color filter 77 is disposed at an optical path of the fluorescent lamp 76. The color filter 77 is constituted so as to arrange a R-transmission filter section 77a, a G-transmission filter section 77b, and a B-transmission filter section 77c in a belt-like shape. One of the three filter sections 77a, 77b and 77c is adapted to be selectively positioned at the optical path of the fluorescent lamp 76. When a filter changing signal is inputted, the color filter 77 is moved in a direction shown by an arrow D to change the respective filter sections 77a, 77b and 77c. Owing to this, the light of the fluorescent lamp 76 becomes the printing light having one color of R, G and B after passing through the color filter 77.

The printing light is discharged through openings 75a and 59a via a liquid crystal array 78, a mirror 79, a graded index type optical fiber array 80, and a mirror 81. The discharged printing light reaches the photosensitive surface of the instant film 31. The liquid crystal array 78 includes fine liquid crystal segments which are aligned. One of the liquid crystal segments corresponds to one pixel for printing. The liquid crystal array 78 is capable of controlling a tone of each of the liquid crystal segments. Further, the liquid crystal array 78 intercepts the printing light and controls an amount of the transmission light. The graded index type optical fiber array 80 prevents the printing light of each pixel from expanding to an area corresponding to the other pixel. Incidentally, although illustration is abbreviated, a light shielding member is attached to the inside of the case 75 so that only the printing light is discharged through the opening 75a.

In FIG. 3, the gear box 49 is constituted of a motor 83, a reduction gear train 84, a pair of spreading rollers which is not shown, and so forth. A case 85 of the gear box 49 is formed with a film receiving slit 85a which is located at a position facing the film outlet 32b of the film pack 30. The pair of the spreading rollers is disposed behind the film receiving slit 85a and is rotated by the motor 83 via the reduction gear train 84. The instant film 31 is caught with the pair of the spreading rollers to be conveyed in the direction shown by the arrow A. Meanwhile, the claw 51 is actuated by the motor 83 via an interlock mechanism which is not shown.

When the motor 83 is driven, the claw 51 abuts on a lower edge of the instant film 31 to push it out of the film pack 30 in the direction shown by the arrow A. An upper edge of the instant film 31 is advanced toward the pair of the spreading rollers through the film outlet 32b and the film receiving slit 85a. At this time, the pair of the spreading rollers is rotated via the reduction gear train 84 so that the instant film 31 is continuously conveyed thereby in the direction shown by the arrow A to be drawn out of the film pack 30.

An upper portion of the instant film 31 is provided with a pod including the aforesaid developer. The pair of the spreading rollers is urged by a spring such that the spreading rollers approach each other. Thus, when the instant film 31 is conveyed by the pair of the spreading rollers, the pod is broken to spread the developer between the photosensitive sheet and the receiver sheet.

Figure 6:
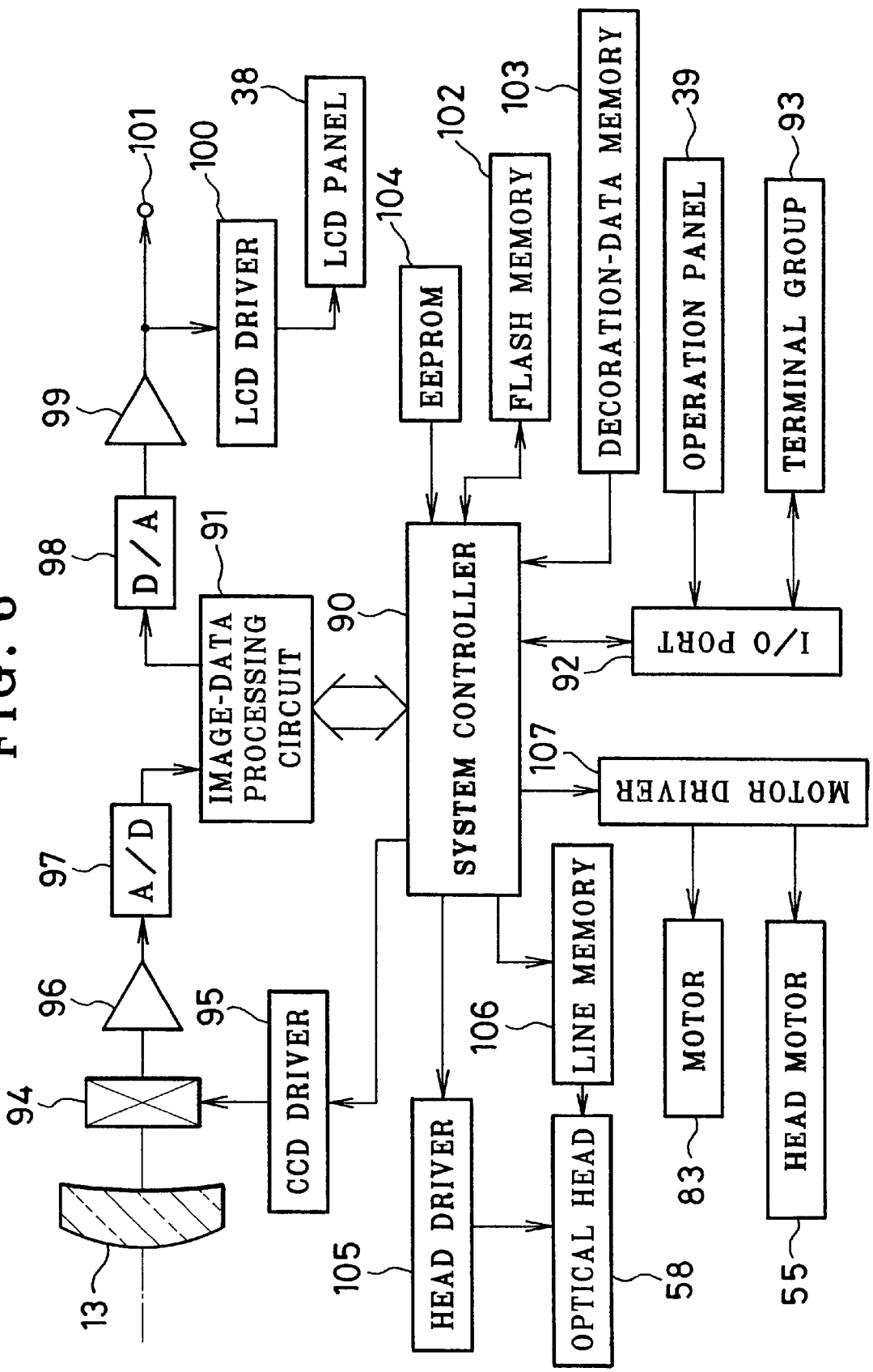
FIG. 6 is an explanatory illustration schematically showing an electrical structure of the electronic still camera.

FIG. 6 schematically shows an electrical structure of the electronic still camera 10. A system controller 90 totally controls an electric operation of the electronic still camera 10 including an image-data processing circuit 91. The system controller 90 processes signals in accordance with input signals supplied from the operation panel 39 and a terminal group 93 used for external connections. The operation panel 39 and the terminal group 93 are connected to an I/O port 92 so that the input signals are supplied to the system controller 90 via the I/O port 92.

A CCD image sensor 94 is disposed behind the taking lens 13. On a photoelectric surface of the CCD image sensor 94, minute microcolor filters of R, G and B are arranged in matrix. An optical subject image is formed on the photoelectric surface of the CCD image sensor 94 through the taking lens 13. The optical subject image is converted into electrical image signals of the respective colors by means of a CCD driver 95. Then, the image signal is outputted to an amplifier 96.

The image signal is amplified by the amplifier 96 and is converted into a digital signal by an A-D converter 97. The converted digital signal is inputted into the image-data processing circuit 91 in which predetermined image processing is executed for the inputted image data. Based on the processed image data, the image-data processing circuit 91 produces a picture signal corresponding to a composite signal of the NTSC system. The picture signal is inputted into an LCD driver 100 via a D-A converter 98 and an amplifier 99.

The aforesaid LCD panel 38 provided on the rear face of the camera body 11 is driven by the LCD driver 100 to continuously display the subject image. The picture signal is also outputted from an output terminal 101 so that it is possible to watch the continuous subject image taken by the CCD image sensor 94 if a home television is connected to the output terminal 101. Incidentally, as well known, a drive source of the CCD driver 95 is adapted to be synchronized with sampling timing of the A-D converter 97.

A flash memory 102 is constituted of a DRAM being capable of rapid access. The image data, for which the predetermined signal processing has been executed in the image-data processing circuit 91, is stored in the flash memory 102 every picture. For instance, the flash memory 102 has storage capacity corresponding to the image data of fifty pictures. In a decoration-data memory 103, is written in advance decoration data for changing a shape and a design of a picture frame surrounding the subject image. Under a reproduction/print mode, the data read from both of the flash memory 102 and the decoration-data memory 103 are transmitted to the image-data processing circuit 91 to compose the images as the need arises. The composed image is displayed on the LCD panel 38.

An EEPROM 104 stores various kinds of adjustment data in advance. The system controller 90 refers to the adjustment data when the electronic still camera 10 is operated along the prescribed sequence. As to the adjustment data, for example, there are data concerning focus adjustment of the taking lens 13, color correction data at the time of printing, and so forth.

A head driver 105 controls the liquid crystal array 78 of the optical head 58 in response to an instruction of the system controller 90. The optical head 58 receives the image data from a line memory 106. The image data is used for controlling transmittance and a light emission period (open period) of each liquid crystal segment constituting the liquid crystal array 78. A motor driver 107 controls, in response to an instruction of the system controller 90, the head motor 55 and the motor 83 used for spreading the developer. Incidentally, as stated above, the head motor 55 is provided in the head module 50 and the motor 83 is provided in the gear box 49.

Next, an operation of the above-mentioned structure is described below. When the power switch 41 of the electronic still camera 10 is turned on, a photograph mode is set to continuously take the subject image with the CCD image sensor 94. This image is displayed on the LCD panel 38 working as the electric viewfinder. After framing has been performed, the shutter button 16 is depressed. Upon this, the image data of the subject image displayed on the LCD panel 38 at that time is written in the flash memory 102. In case subject brightness lacks due to night photography and indoor photography, the flash emitting portion 14 is activated to perform flash photographing.

The flash memory 102 can store the image data corresponding to fifty pictures at a maximum. Even if the maximum number of the pictures have been taken, the image data newly taken may be stored by erasing the unnecessary image data. These processes are carried out by combining the multi-operation key and the eraser button. Incidentally, the maximum number of the pictures stored in the flash memory 102 is increased and decreased in accordance with the storage capacity thereof. If an output terminal of the terminal group 93 is connected to another storage medium, it is possible to store the newly taken image data in the external storage medium. In this case, it is also possible to store the image data read from the flash memory 102 and transmitted therefrom.

When the reproduction/print mode is set with the mode changing key 44, it is possible by using the multi-operation key 43 to select any image data stored in the flash memory 102. The subject image corresponding to the selected image data is displayed on the LCD panel 38. Moreover, when the decoration frame is selected, the subject image and the decoration frame are composed to be displayed on the LCD panel 38.

Upon pressing the print key 42 after selection of the subject image and the decoration frame, the system controller 90 accesses the flash memory 102 to read red image data of a first line in a sequential manner. The read image data is transmitted to the line memory 106. When the decoration frame is selected, red image data of a first line thereof is similarly transmitted from the decoration-data memory 103 to the line memory 106. In a portion overlapping with the red image data of the flash memory 102, the red image data read from the decoration-data memory 103 is used with priority. In this way, the red image data of the first line is written in the line memory 106.

The system controller 90 sends the filter changing signal to the head driver 105. Upon this, the R-transmission filter section 77a of the color filter 77 provided in the optical head 58 is set to the optical path of the fluorescent lamp 76. After confirming that the liquid crystal segments of the liquid crystal array 78 are kept in a light shielding state, the fluorescent lamp 76 is turned on to emit the R-printing light toward the liquid crystal array 78.

The head module 50 is in an initial position facing the lowest portion of the instant film 31. The initial position corresponds to a record position of the first line. In response to the instruction of the system controller 90, the red image data of the first line stored in the line memory 106 is sent to the liquid crystal array 78 in a sequential manner so that transmission density of each liquid crystal segment is changed from the light shielding state to the transmission density corresponding to the red image data. Consequently, the R-printing light has a light amount corresponding to the transmission density of each liquid crystal segment, and performs red exposure for the instant film 31. After a predetermined period has passed, each liquid crystal segment returns to the light shielding state.

The image data stored in the line memory 106 may be simultaneously transmitted to the liquid crystal segments of the liquid crystal array 78. In this case, the liquid crystal segments may be simultaneously changed from the light shielding state to the transmission density corresponding to the image data. Thus, it is possible to shorten the print duration of one line.

When the red exposure of the first line has been completed with the R-printing light, the head motor 55 built in the head module 50 is driven to move the head module 50 to a position of the second line. The-red image data of the second line is transmitted from the flash memory 102 to the line memory 106. Then, similarly to the above, the red exposure of the second line is performed with the R-printing light. In this way, the red exposure is performed with the R-printing light, moving the head module 50 one line by one line toward the gear box 49. When the last line has been recorded, the red exposure of the R-printing light is completed.

Successively, the system controller 90 sends the filter changing signal to the head driver 105 to place the G-transmission filter section 77b at the optical path of the fluorescent lamp 76. Moreover, the system controller 90 accesses the flash memory 102 to read the green image data of the last line in the sequential manner. The read green image data is transmitted to the line memory 106. After that, similarly to the red exposure performed with the R-printing light, green exposure is performed with the G-printing light from the last line toward the first line.

After the green exposure of the G-printing light has been finished, the system controller 90 sends the filter changing signal to the head driver 105 to place the B-transmission filter section 77c at the optical path of the fluorescent lamp 76. Further, the system controller 90 accesses the flash memory 102 to read the blue image data of the first line in the sequential manner. The read blue image data is transmitted to the line memory 106. After that, similarly to the red exposure, blue exposure is performed with the B-printing light. In this way, the exposure is completed with the printing light of each color of R, G and B.

After the instant film 31 has been exposed in accordance with the image data, the system controller 90 rotates the motor 83 via the motor driver 107. Owing to this, the claw 51 is actuated by means of the interlock mechanism. The claw 51 abuts on the lowest edge of the exposed instant film 31 to push it out of the film pack 30 toward the pair of the spreading rollers. At this time, the head module 50 is positioned at a side of the gear box 49 so that the claw 51 is not prevented from moving.

The top edge of the instant film 31 pushed out of the film pack 30 is interposed between the pair of the spreading rollers which is rotated by the motor 83 via the reduction gear train 84. Thus, the instant film 31 is conveyed in the direction shown by the arrow A. At this time, the pod provided on the upper portion of the instant film 31 is broken to spread the developer between the photosensitive sheet and the receiver sheet. The claw 51 returns to the original position after moving to the end of a stroke, and then, is stopped. When the claw 51 returns to the original position, the system controller 90 drives the head motor 55 via the motor driver 107 to return the head module 50 to the initial position.

The instant film 31 conveyed by the pair of the spreading rollers pushes up the light shielding lid 36 provided on the upper face of the camera body 11. The instant film 31 is discharged through the exit 11b, opening the light shielding lid 36. After a few minutes, the subject image is fixed on the receiver sheet as a positive image. It is possible to obtain a hard copy of the subject image displayed on the LCD panel 38 at the time of pressing the print key 42. Of course, when the decoration frame is selected, the subject image is printed within the decoration frame.

Figure 7:
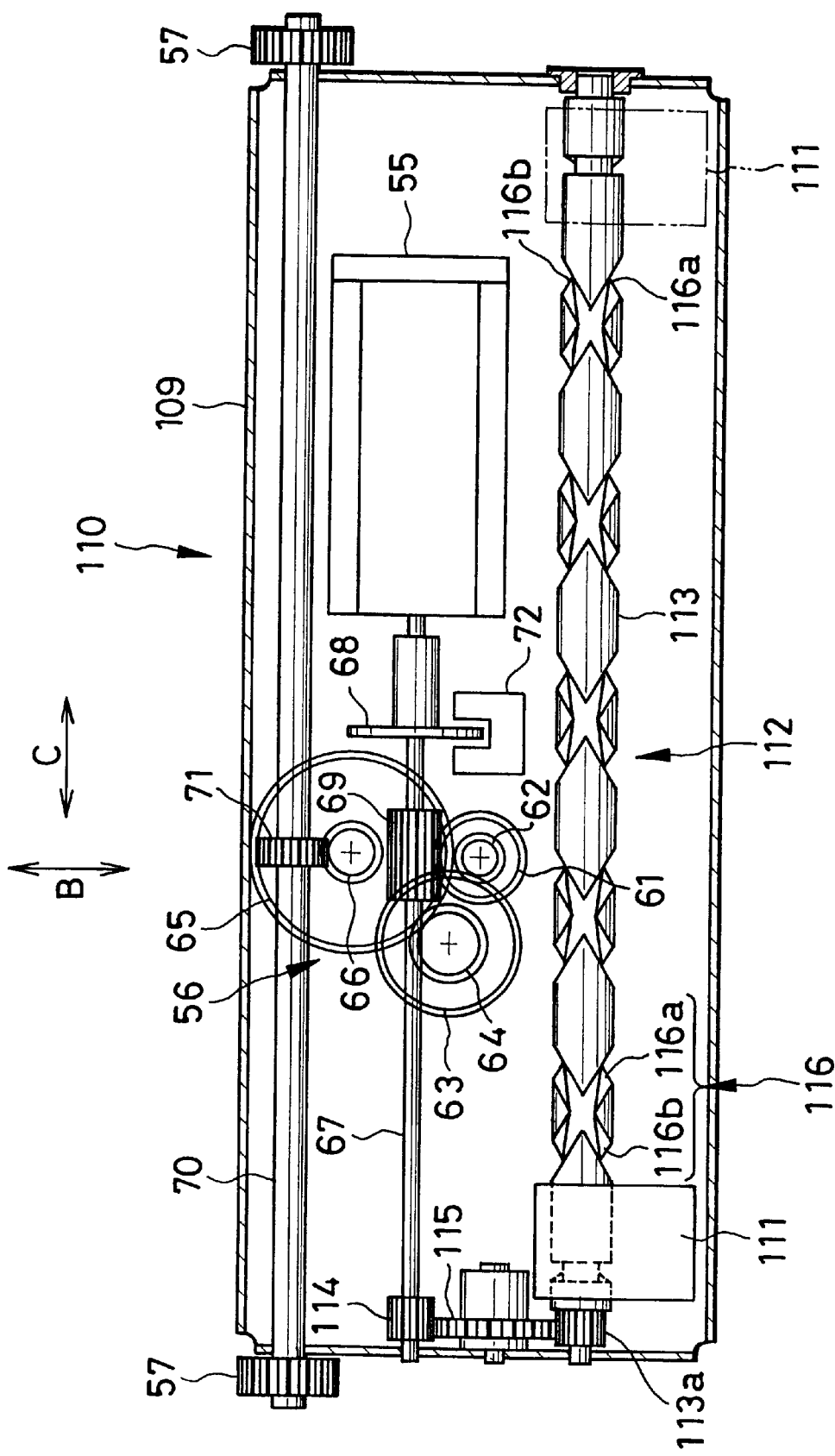
FIG. 7 is a plan view showing another embodiment of the head module.

The above embodiment relates to a line printer using the liquid crystal array in which the liquid crystal segments are aligned in the main-scanning direction. Besides the line printer, it is possible to use a serial printer in which the optical head is moved in the main-scanning direction to perform the exposure of each line. In this case, such as shown in FIG. 7, a head case 109 contains a head moving mechanism 112 in addition to a driving mechanism which comprises the head motor 55 for moving a head module 110 in the sub-scanning direction. The head moving mechanism 112 moves a small optical head 111 in the main-scanning direction in association with the rotation of the head motor 55. Incidentally, the driving mechanism of the head module is identical with the above embodiment so that the identical member thereof is denoted by the same reference numeral.

The head moving mechanism 112 is constituted of a head moving shaft 113, a D10 gear 114, and a D11 gear 115. These gears 114 and 115 transmit the drive force of the head motor 55 to the head moving shaft 113. The drive force of the head motor 55 is transmitted, via the D10 gear 114 and the D11 gear 115, to a D12 gear 113a formed at one end of the head moving shaft 113. In virtue of these gears, the head moving shaft 113 is rotated. The optical head 111 is movably attached to the head moving shaft 113. A pin provided on the optical head 111, which is not shown, engages with a groove 116 formed in the head moving shaft 113. The groove 116 comprises a first groove 116a and a second groove 116b.

When the head moving shaft 113 is rotated, the pin is moved along the first groove 116a toward the right in FIG. 7 so that the optical head 111 is also moved toward the right. When the optical head 111 is moved to a right side so as to be shown by a two-dotted line, the pin is moved along the second groove 116b toward the left in FIG. 7 so that the optical head 111 is similarly moved toward the left. Further, when the optical head 111 is moved to a left side so as to be shown by a solid line, the pin is moved again along the first groove 116a toward the right so that the optical head 111 is similarly moved to the right. In this way, the optical head 111 is adapted to be reciprocated in the main-scanning direction during the rotation of the head moving shaft 113, namely during movement of the head module 110.

As described above, the optical head 111 is moved from the left to the right during forward movement, and is moved from the right to the left during backward movement. The system controller controls the optical head 111 such that the printing light is emitted in accordance with the image data during either of the forward movement and the backward movement. The reason for doing so is as follows. The optical head 111 is moved in association with the movement of the head module 110 so that the record line is slightly inclined relative to the main-scanning direction. If the printing light is emitted during both of the forward movement and the backward movement, overlap is especially caused at the both ends.

In the foregoing embodiment, the instant film is used. The present invention, however, is not exclusive to this. It is possible to use other photosensitive recording mediums instead of the instant film.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An optical head device for recording an image, in which an optical head for emitting a printing light is moved in a first direction being parallel with a surface of a photosensitive recording medium, comprising:

a head module having said optical head built therein;

a reduction mechanism provided in said head module, said reduction mechanism including a pair of drive gears;

a chassis for movably supporting said head module;

a pair of rack gears formed on said chassis, the pair of said rack gears respectively meshing with the pair of said drive gears of said reduction mechanism; and a motor provided in said head module and connected to said reduction mechanism, said motor moving said optical head in said first direction together with said head module by rotating said drive gear on said rack gear.

2. An optical head device according to claim 1, wherein said optical head has a pixel array extending in a second direction perpendicular to said first direction to emit the printing light of a line shape.

3. An optical head device according to claim 2, wherein said head module is moved one line by one line.

4. An optical head device according to claim 3, wherein said reduction mechanism is connected to a drive shaft of said motor to which a rotary encoder is attached, and movement of said head module is controlled in accordance with a signal outputted from said rotary encoder.

5. An optical head device according to claim 1, wherein said optical head is movable in a second direction perpendicular to said first direction, said optical head being moved in said second direction by said motor in synchronism with the movement of said head module.

6. An optical head device according to claim 5, further comprising:

a head moving shaft disposed in said second direction, said optical head being reciprocated along said head moving shaft.

7. An optical head device according to claim 6, wherein said head moving shaft is formed with a first groove and a second groove, said optical head being moved forward when engaging with said first groove, and said optical head being moved backward when engaging with said second groove.

8. An optical head device according to claims 2 or 5, wherein said recording medium is an instant film unit contained in a pack to be set on said chassis.

9. An optical head device according to claims 2 or 5, wherein a control signal of said printing light and a drive signal of said motor are supplied via a common flexible circuit board, one end of which is connected to said head module.

10. An optical head device according to claims 2 or 5, wherein said head module is formed with an opening facing said optical head, said printing light being emitted to said recording medium through said opening.

11. An optical head device according to claim 1, wherein the pair of said drive gears are disposed at both sides of said head module.

12. An optical head device according to claim 11, wherein the pair of said rack gears meshing with the pair of said drive gears are disposed at both sides of said chassis.

13. An optical head device according to claim 12, wherein said reduction mechanism includes a gear train for transmitting a driving force of said motor to said drive gears.

* * * * *